W. THELE.
SELF ACTING TIPPING VESSEL WITH TRAVELING CARRIAGE.
APPLICATION FILED NOV. 1, 1909.

986,325.

Patented Mar. 7, 1911.

Witnesses:

Inventor
Walter Thele
by W. Schornborn
Attorney.

UNITED STATES PATENT OFFICE.

WALTER THELE, OF HAMBURG, GERMANY.

SELF-ACTING TIPPING VESSEL WITH TRAVELING CARRIAGE.

986,325.

Specification of Letters Patent.

Patented Mar. 7, 1911.

Application filed November 1, 1909. Serial No. 525,821.

*To all whom it may concern:*

Be it known that I, WALTER THELE, a citizen of the German Empire, residing at Hamburg, in the State of Hamburg and the German Empire, have invented certain new and useful Improvements in Self-Acting Tipping Vessels with Traveling Carriages, of which the following is a specification.

The present invention consists in so connecting the traction rope of the traveling carriage with the tipping vessel that it brings the latter upright again before the commencement of the return movement of the traveling carriage. The connection between the traction rope and the vessel is effected by connecting rods which are interposed between the vessel and the supporting catch. The traction rope preferably engages with a lever which moves the vessel by means of a connecting bar. To enable the lever to change its position according to the direction of movement of the traveling carriage the connecting bar is provided with a slot.

In order to tip over the vessel exactly at the place on the road way of the carriage defined by the stop a brake is suitably connected with a vessel which is tightened on the tipping over of the vessel. The brake serves also to increase the resistance to movement of the traveling carriage to such an extent that the vessel is first tilted up into the upright position by the pull of the carriage traction rope before the traveling carriage itself begins to move. The connection of the vessel with the brake is so arranged that the latter is slackened, that is put out of action, after the vessel is brought upright.

The accompanying sheet of drawings shows, by way of example, one method of carrying out the invention, in which—

Figure 1:
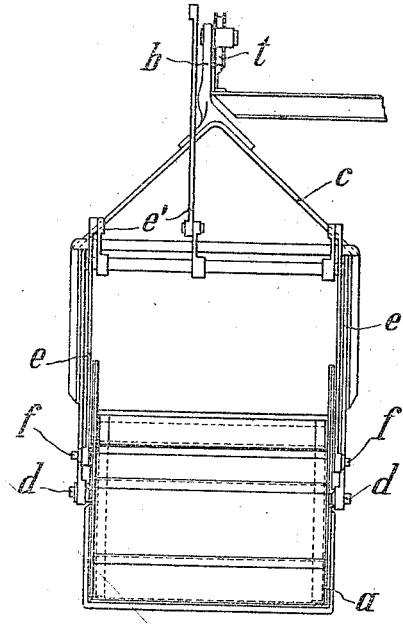
Figure 2:
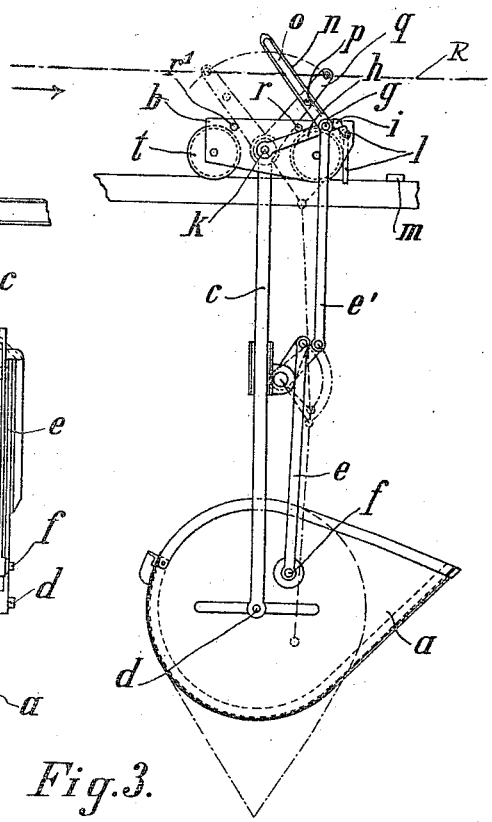
Figure 3:
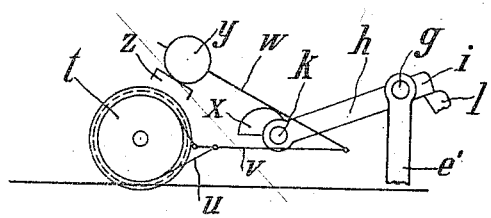

Figure 1 is a back view, Fig. 2 a side view and Fig. 3 the brake apparatus.

The tipping vessel $a$ is hung to the traveling carriage $b$ by a hanger bar $c$ in which it rests or is pivoted by the pins $d$. These pins $d$ are so placed that the weight of the vessel itself is balanced, but the center of gravity of its volume or contents lies to one side of the point of suspension. Two connecting bars $e$ engage with side pins $f$ of the tipping vessel, which bars are connected by levers with another connecting bar $e'$. This bar $e'$ is connected by means of a pin $g$, to a lever $h$ which is rotatably connected to the traveling carriage $b$ by the pin $k$. The lever $h$ bears with its end $i$ on the catch $l$ which is likewise rotatable around a point on the traveling carriage $b$. In the path of the catch $l$ is placed a stop $m$ adjustable and fixable on the supporting rail. A lever $q$ is also pivoted on the pin $k$ and a pin $p$ on it engages in the slot $o$ of the lever $n$ which is rotatable on the pin $g$ of the lever $h$. Two stops $r$ and $r^1$ limit the movement of the lever $q$. The traction rope R of the traveling carriage $b$ is secured to the end of the lever $q$.

On one of the traveling wheels $t$ of the carriage $b$ is fixed a brake pulley around which passes a brake band $u$. To the brake lever $v$ is pin-jointed a two-armed lever $w$, which has its fulcrum on a cam $x$ connected with the lever $h$, and which lever $w$ carries a weight $y$ at its end. This weight $y$ rests on a support $z$ when the brake is out of action.

The action of the apparatus is as follows:—The traveling carriage $b$, with the filled vessel $a$ in the position shown in full lines in Fig. 2, is moved in the direction of the arrow and toward the stop $m$. When the catch $l$ strikes the stop $m$ the lever $h$ loses its support and the vessel $a$ is tipped down by the weight of its contents into the position shown in dotted lines. The arm $n$ slides down with the lever $h$ until the upper end of the slot $o$ reaches the pin $p$ on the lever $q$. The cam $x$ turns with the lever $h$ and raises the two-armed lever $w$, thereby raising the weight $y$ from the support $z$ and tightening the brake. After the tipping vessel $a$ is emptied the traction rope is drawn in the opposite direction, but as the traveling carriage $b$ is fixed by the brake it cannot yield to the pull of the traction rope, and the latter therefore first draws the lever $q$ into the position, (limited by the stop $r^1$) shown in Fig. 2 by dotted lines. The lever $h$ and the tipping vessel $a$ follow the lever $q$ into the position shown in full lines thereby tipping the vessel back into the upright position. In this position the catch $l$ again takes under the end $i$ of the lever $h$, the cam $x$ again takes the position shown in Fig. 3 and the brake is slackened. The traveling carriage is then traversed back to the filling place and the operations are repeated.

I claim—

1. In combination with a traveling carriage, a tipping vessel pivotally supported from said carriage on a horizontal axis, operating rods connected with said vessel, a lever connected with said carriage, a catch releasably holding said vessel and rods in a raised position, a traction rope connected with said lever, and means connected with said lever and rods whereby said vessel by the action of the traction rope is tipped back from its dumped position to its upright position before the commencement of the backward movement of said carriage.

2. In combination with a traveling carriage, a tipping vessel pivotally supported from said carriage on a horizontal axis, operating rods connected with said vessel, a catch releasably holding said vessel and rods in a raised position, a lever rotatable on said traveling carriage between two stops and connected with the traction rope, and a slotted arm connecting said rotatable lever with said operating rods.

3. In combination with a traveling carriage, a tipping vessel pivotally supported from said carriage on a horizontal axis, operating rods connected with said vessel, a lever rotatably connected with said carriage, and operated by the traction rope, a catch releasably holding said vessel and rods in a raised position, a brake on a wheel of said traveling carriage, means for tightening said brake by the downward tipping of said vessel, and means for connecting said lever and operating rods so that the vessel by the action of the traction rope is tipped back from its downward position to its upright position before the commencement of the backward movement of said carriage.

4. In combination with a traveling carriage, a tipping vessel pivotally supported from said carriage on a horizontal axis, operating rods connected with said vessel, a lever pivotally connected with said carriage and operated by the traction rope, a catch releasably holding said rods and vessel in a raised position, a brake on the wheel of said traveling carriage, means for tightening said brake by the downward tipping, and slackening said brake by the upward tipping of said vessel, and means connecting said lever and operating rods whereby said vessel by the action of the traction rope is tipped back from its downward position to its upright position before the commencement of the backward movement of said carriage.

5. In combination with a traveling carriage, a tipping vessel pivotally supported from said carriage on a horizontal axis, operating rods connected with said vessel, a lever pivotally connected with said carriage and operated by the traction rope, means for connecting said lever with the operating rods, a cam operated by the tipping of said vessel, a brake on a wheel of said carriage, a brake lever, a two-armed lever carrying a weight and connected to said brake lever, and having its fulcrum upon said cam moved by said tipping vessel.

In testimony whereof I have hereunto set my hand in presence of two witnesses.

WALTER THELE.

Witnesses:
ERNEST H. L. MUMMENHOFF,
OTTO WALTER HELLMRICH.